United States Patent
McAlpine et al.

(10) Patent No.: US 11,232,712 B2
(45) Date of Patent: Jan. 25, 2022

(54) PAVER HAUL TRUCK GROUPING

(71) Applicant: Caterpillar Paving Products Inc., Brooklyn Park, MN (US)

(72) Inventors: Jacob J. McAlpine, Otsego, MN (US); John L. Marsolek, Watertown, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 442 days.

(21) Appl. No.: 16/239,228

(22) Filed: Jan. 3, 2019

(65) Prior Publication Data
US 2020/0219400 A1 Jul. 9, 2020

(51) Int. Cl.
| G08G 1/00 | (2006.01) |
| H04W 4/021 | (2018.01) |
| B60Q 9/00 | (2006.01) |
| E01C 23/00 | (2006.01) |
| G06Q 50/28 | (2012.01) |

(52) U.S. Cl.
CPC ............... *G08G 1/207* (2013.01); *B60Q 9/00* (2013.01); *H04W 4/021* (2013.01); *E01C 23/00* (2013.01); *G06Q 50/28* (2013.01)

(58) Field of Classification Search
CPC ...... G08G 1/207; G08G 1/0968; G08G 1/123; H04W 4/021; H04W 4/023; H04W 4/029; H04W 4/42; B60Q 9/00; E01C 23/00; E01C 19/48; G06Q 50/28
See application file for complete search history.

(56) References Cited

U.S. PATENT DOCUMENTS

| 5,015,120 | A | 5/1991 | Brock et al. |
| 6,611,755 | B1 | 8/2003 | Coffee et al. |
| 6,805,516 | B2 | 10/2004 | Barnat et al. |
| 8,356,957 | B2 | 1/2013 | Weiser |
| 8,626,541 | B2 | 1/2014 | Doan et al. |
| 9,481,964 | B1 | 11/2016 | Marsolek |
| 9,545,048 | B2 | 1/2017 | Pickett et al. |
| 9,562,334 | B2 | 2/2017 | Von Der Lippe et al. |
| 9,611,595 | B2 | 4/2017 | Marsolek et al. |
| 2012/0288328 | A1* | 11/2012 | Minich ................. E01C 19/004 404/72 |
| 2013/0290062 | A1* | 10/2013 | Patel ................ G06Q 10/06313 705/7.23 |
| 2015/0262433 | A1* | 9/2015 | Davidson ............. G08G 1/0112 701/1 |
| 2016/0203651 | A1* | 7/2016 | Heath ..................... H04W 4/40 705/13 |
| 2017/0130405 | A1 | 5/2017 | Engelmann |
| 2017/0356140 | A1 | 12/2017 | Neumann |

FOREIGN PATENT DOCUMENTS

| CN | 1503157 | 6/2004 |
| EP | 0381882 | 7/1995 |

* cited by examiner

*Primary Examiner* — Daryl C Pope
(74) *Attorney, Agent, or Firm* — Schwegman, Lundberg & Woessner

(57) ABSTRACT

A method of establishing a desired flow of haul trucks with respect to a jobsite can include receiving, from a paver locating device, a paver location signal indicative of a location of a paver. A central computer can establish a desired location range of the first haul truck based on the paver location signal and a first haul truck location signal.

20 Claims, 8 Drawing Sheets

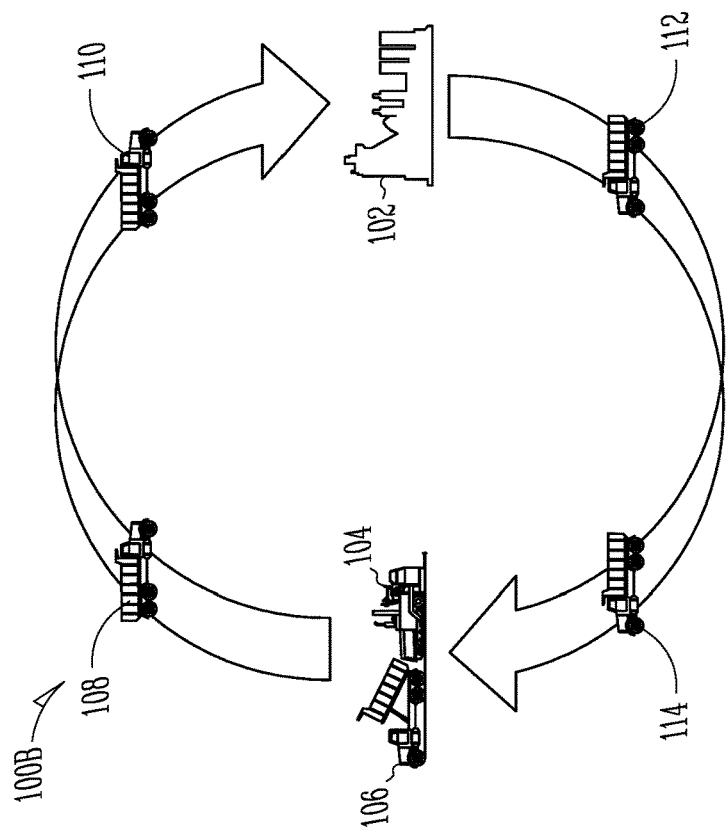
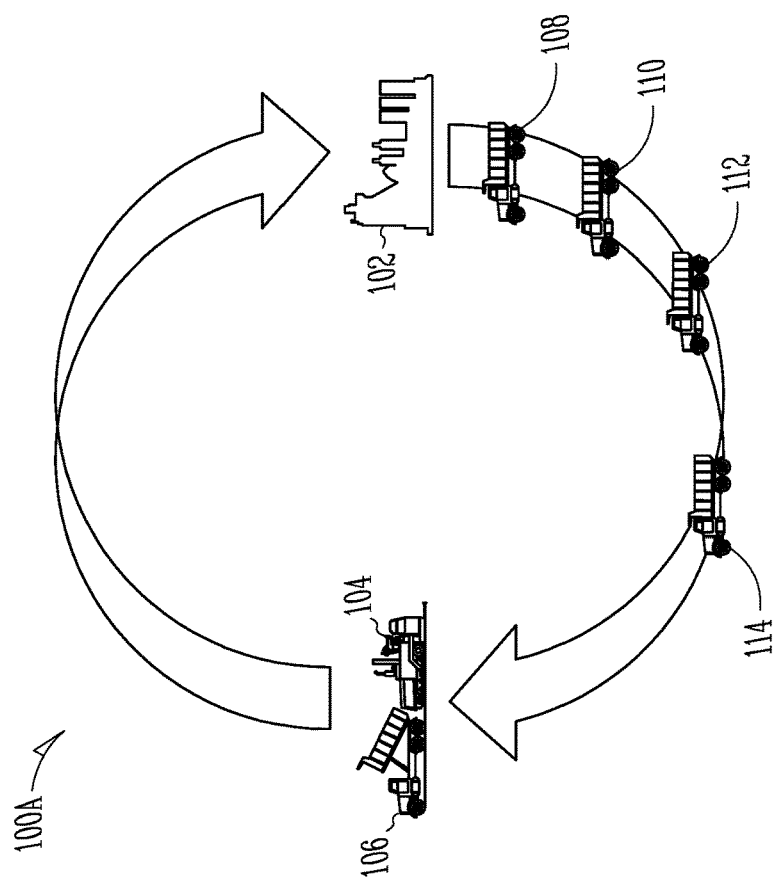

PAVER HAUL TRUCK GROUPING

TECHNICAL FIELD

This disclosure relates generally, but not by way of limitation, to monitoring heavy equipment location. More particularly, this disclosure relates to location monitoring and control of paving machinery and supporting trucks.

BACKGROUND

Pavers or paving machines can be used in a paving process to create a new road surface. When performing paving operations, paving machines, haul trucks, and remixing transfer vehicles can be used to perform a variety of tasks, and in doing so, can move about a job site. Haul trucks may be required to move between a job site and a plant. The operation of these machines can be coordinated to perform a paving operation in an efficient manner. Coordination of haul trucks and pavers is discussed in U.S. Pat. No. 9,481,964 by Marsolek, issued Nov. 1, 2016, which discusses systems for communication between a plant and machines or equipment, such as haul trucks and pavers.

Haul trucks can be coordinated to help the paver perform paving operations in an efficient manner. Maintaining a steady and efficiently spaced flow of haul trucks between the plant and the paving jobsite is important to provide adequate material to the paver, material quality (as asphalt within a truck cools it impacts the final product), and efficiency of haul trucks and personnel by reducing operational costs. Accordingly, a poor flow of haul trucks (inconsistent flow or poor spacing) can negatively impact the quality of the completed roadway and can increase operating costs due to inefficient use of equipment and personnel.

The paving industry often relies on knowledge, experience, and attentiveness of the plant and haul truck operators to recognize when there is a potential problem and to communicate and organize to optimize truck flow. However, human error, interruptions in communication, and miscommunication can cause sub-optimal haul truck grouping during paving operations.

SUMMARY OF THE INVENTION

A system for monitoring haul truck positioning can include a paver locating device couplable to a paver and configured to produce a paver location signal indicative of a location of the paver. The system can include a haul truck locating device securable to a haul truck, where the haul truck locating device can be configured to produce a haul truck location signal indicative of a location of the haul truck. The system can also include a central computer configured to determine a jobsite boundary of a paving jobsite based on the paver location signal or a predetermined location of the jobsite. The controller can also be configured to define a desired location range of the haul truck based on the paver location signal, the jobsite boundary, and the haul truck location signal. The controller can also be configured to produce an alert when the location of the haul truck is outside the desired location range.

A method of establishing a desired flow of haul trucks with respect to a jobsite can include receiving, from a paver locating device, a paver location signal indicative of a location of a paver. A first haul truck location signal indicative of a location of the first haul truck can be received from a first haul truck locating device. A jobsite geofence indicative of a boundary of the jobsite can be established. A desired location range of the first haul truck based on the paver location signal, the jobsite geofence signal, and the first haul truck location signal can be established by a central computer. An alert can be produced when the location of the first haul truck is outside the desired location range.

A method of establishing a desired flow of haul trucks with respect to a jobsite can include receiving, from a paver locating device, a paver location signal indicative of a location of a paver. A first haul truck location signal indicative of a location of a first haul truck can be received from a first haul truck locating device. A second haul truck location signal indicative of a location of a second haul truck can be received from a second haul truck locating device. A desired location range of the first haul truck based on the paver location signal, the first haul truck location signal, and the second haul truck location signal can be established by a central computer. An alert can be produced when the location of the first haul truck is outside the desired location range.

BRIEF DESCRIPTION OF THE DRAWINGS

FIG. 1A is a schematic view of a flow diagram of a paving operation in a first condition, in accordance with at least one example of the present disclosure.

FIG. 1B is a schematic view of a flow diagram of a paving operation in a second condition, in accordance with at least one example of the present disclosure.

DETAILED DESCRIPTION

Figure 2:
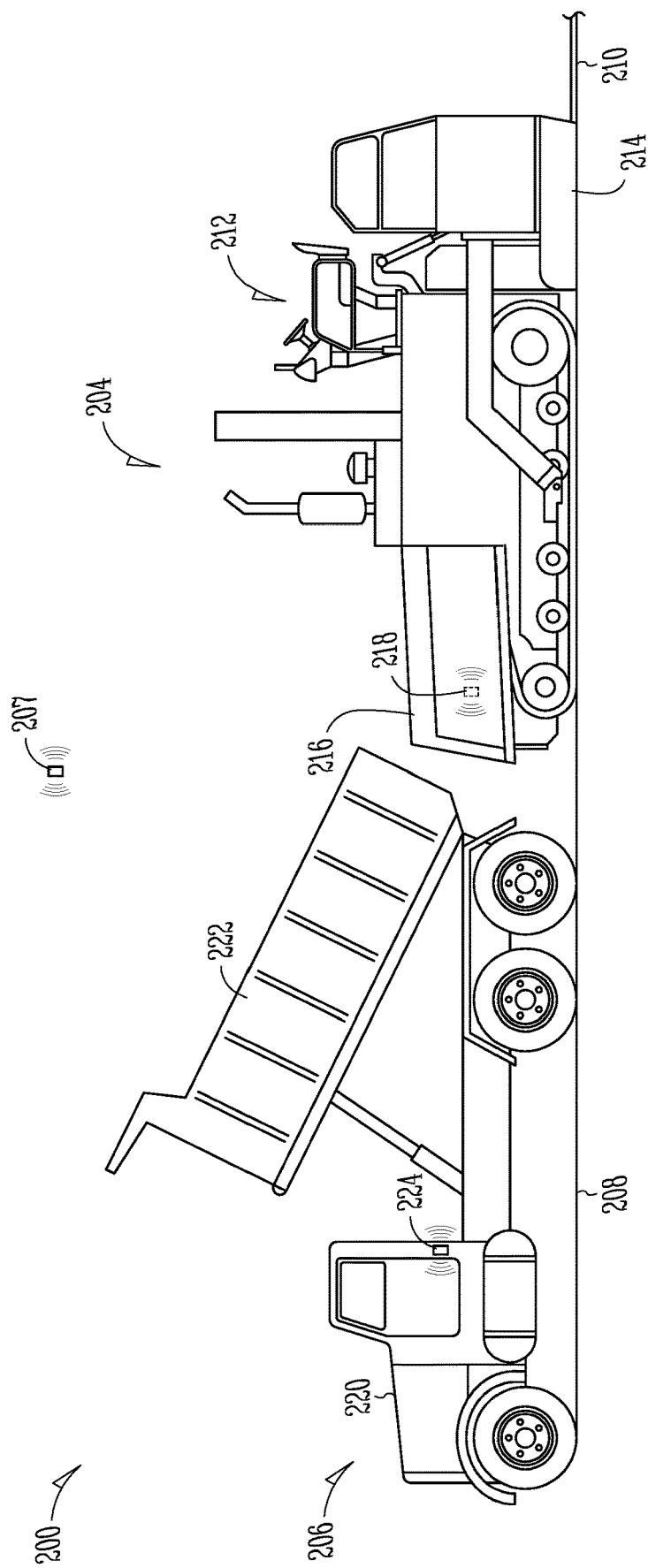
FIG. 2 is an elevation view of a haul truck and a paver, in accordance with at least one example of the present disclosure.

The inventors have recognized, among other things, that a central computing system can be used to receive location signals from one or more haul trucks, a jobsite, and a paver. The central computing system can use these and other inputs to determine optimum parameters of the haul trucks including grouping or flow. An alert can be produced when any of the haul trucks is outside of the optimum grouping or optimum location at any given time. Further, information from an asphalt plant, such as ticket information, can be used to determine when a haul truck unloads or loads. Such information can be further used by the central computing system to determine an optimal haul truck grouping and flow arrangement and whether each haul truck is at a position or location compliant with an optimal haul truck grouping.

FIG. 1A is a flow diagram illustrating a paving operation in a first condition 100A, in accordance with at least one example of the present disclosure. FIG. 1B is a flow diagram illustrating a paving operation in a second condition 100B, in accordance with at least one example of the present disclosure. FIGS. 1A and 1B are discussed below concurrently.

The first and second conditions 100A and 100B show a plant 102, a paver 104, and haul trucks 106, 108, 110, 112, and 114. Also shown in FIGS. 1A and 1B are directional arrows indicative of haul truck flow with respect to the paver 104 and the plant 102.

The plant 102 can be one or more plants where a paving material, such as asphalt, can be produced and loaded onto trucks. The plant 102 can produce the paving material such as asphalt from bitumen, aggregate, and other materials or fillers. The paving material can be produced in batches with each batch stored or held in separate storage or holding locations, such as a silo, until it is loaded onto a haul truck at a loading station. Holding locations can be dedicated to storing or holding paving material for a particular paving site and paving material within a particular holding location can be periodically loaded into a haul truck for transport to the paving site. The characteristics of each batch stored within a holding location may be set based upon the desired characteristics for a particular paving job. For example, the amount of oil and the size of the aggregate may be set based upon the desired characteristics of the paving material and the requirements of each paving job.

The paver 104 can be a paving machine configured to apply a layer of paving material to a work surface. The paver 104 can receive loads of asphalt or paving materials from any of the haul trucks 106-114 to help continuously produce the work surface. The haul trucks 106-114 can be trucks or automobiles including a box or bed that is liftable to dump a load from the box.

In some examples of a paving operation, the haul trucks 106-114, for example haul truck 106, can travel to the plant 102 to receive a load of asphalt or paving material. The haul truck 106 can then travel to the paver 104 to dump the paving material into the paver 104, as discussed in FIG. 2 in further detail. Following a dump activity, the haul truck 106 can return to the plant 102 with recyclable material or with an empty box. The haul truck 106 can offload the recyclable paving material and can then receive a new load of paving material before returning to the paver 104.

Often, during paving operations, multiple haul trucks are used to drive between the plant 102 and the paver to provide a continuous feed of paving material to the paver 104. Maintaining a steady flow of paving materials from the plant 102 to the paver 104 allows for constant paving. That is, continuous supply of asphalt helps avoid stopping of the paver 1042, which can improve the quality of roadway or new surface.

An example of an ideal haul truck flow is shown in FIG. 1B where the haul truck 106 is at the paver 104, the haul truck 108 is just leaving the paver 104 or jobsite, the haul truck 110 is near the plant 102, the haul truck 112 is leaving the plant 112, and the haul truck 114 is close to arrival at the jobsite or the paver 104.

An example of a suboptimal haul truck grouping is shown in FIG. 1A where the haul truck 106 is shown at the paver 104, but the haul trucks 108-114 are shown as having left the plant, yet to arrive at the jobsite or the paver 104. Such a sub-optimal flow of haul trucks can occur for several reasons. In some examples, a plant operator may load trucks as fast as they arrive at the plant, regardless of the state of the current flow of trucks. In some situations, haul truck operators leave the plant or jobsite and wait for more haul trucks to gather to navigate as a group to their next destination, simplifying the navigation process for follower haul trucks. However, such haul truck flows (where the haul trucks stack up) can be problematic because the paving material in the haul trucks 108-114 can cool and expire. In the example of FIG. 1A, the haul trucks 108 and 110 will have to wait for the haul trucks 112 and 114 to offload, which can cause the paving materials of the haul trucks 108 and 110 to expire. Expired paving material can increase paving operational cost and can reduce paving efficiency. Solutions for these problems are discussed below with respect to FIGS. 2-8.

FIG. 2 is an elevation view of a paving operation 200, in accordance with at least one example of the present disclosure. The paving operation 200 can include a paver 204, a haul truck 206, a jobsite locating device 207, an unfinished surface 208, and a finished surface 210. The paver 204 can include a control portion 212, a screed 214, a hopper 216, and a locating device 218. The haul truck 206 can include a cab 220, a box 222, and a locating device 224.

The paver 204 can be a paving machine configured to apply a layer of paving material to a work surface, as described above with respect to the paver 104. The paver 204 can include a body supporting the hopper 216, the control portion 212, and a material application system including the screed 214. The control portion 212 can include steering, driving, and paving controls for operating the paver 204. The hopper 216 can be a device configured for storing paving material and for transferring the paving material to the material application system. The screed 214 can be used to finalize the form of the newly paved surface. The locating device 218 can be a communication device, described below in further detail, and can be mounted to any portion of the paver 204.

The cab 220 can be a portion of the haul truck 206 that includes controls for driving the haul truck 206 and for operating the box 222 of the haul truck. The box 222 can be operable to receive, carry, and dump material, such as paving material. The locating device 224 can be a communication device, described below in further detail, and can be mounted to any portion of the haul truck 206. The haul truck 206 can be any one of the haul trucks 106-114 of FIGS. 1A and 1B. That is, each of the haul trucks of FIGS. 1A and 1B can include the components of haul truck 206.

The jobsite locating device 207, the paver locating device 218, and the truck locating device 224 can each be a wireless device configured to communicate information wirelessly using any protocol. The locating devices 207, 218, and 224 can also be global position system (GPS) devices configured to use satellite communication to determine a location of the respective devices 207, 218, and 224. The locating devices 207, 218, and 224 can include radio-frequency (RF) or other wireless transceivers configured to communicate data using any wireless protocol including, but not limited to, wi-fi, wi-Max, 3G, 4G LTE/LTE-A, or 5G.

In some examples, the paver can be supplied with paving material by the haul truck 206 when the haul truck 206 is aligned with or adjacent the paver 204. The paver 204 can use the paving material to apply a layer of paving material to the work surface 210. In some instances, the paver 204 may push the haul truck 206 while the paver 204 is simultaneously applying a layer of paving material and the haul truck 206 is loading paving material into the paving machine.

At any time, the locating device 218 of the paver 204 can transmit a signal indicative of a location of the paver. The signal can include location data (such as using a GPS system or prior signal triangulation) or the location can be determined by a receiving device (such as a central computer) using signal triangulation, RF ranging, or other methods of determining a location of a signal.

Similarly, at any time, the locating device 224 of the haul truck 206 can transmit a signal indicative of a location of the haul truck 206. Also, when the haul truck 206 is loading material into the paver 204, the signal produced by the locating device 224 of the haul tuck 206 can be compared to that of the signal of the locating device 218 of the paver 204 to determine that the paver 204 and the haul truck are near each other, as shown in FIG. 2. Such a determination can be used to detect a load activity of the haul truck 206, which can be used to coordinate grouping or flow of other haul trucks, as discussed below in further detail. Further, at any time, the jobsite locating device 207 can transmit a location of the jobsite. In some examples, the jobsite locating device 207 can be a device positioned within the jobsite. In other examples, the jobsite locating device 207 can be a device secured to equipment within the jobsite, such as the paver 204. In some examples where more than one paver is used, the jobsite locating device 207 can be the locating device of one paver where the jobsite geofence or boundary is determined based on only one of the locating devices of the multiple pavers.

Figure 3:
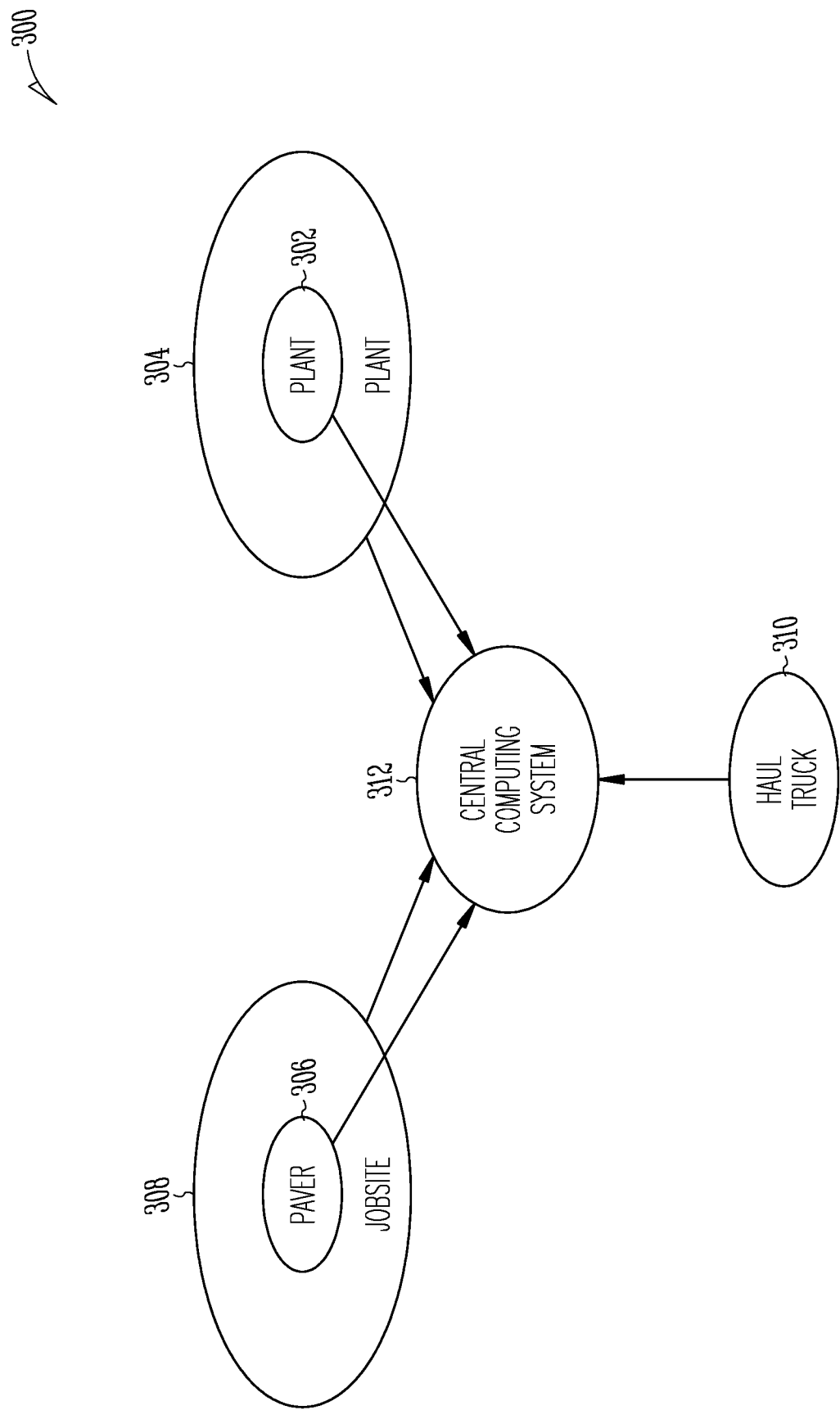
FIG. 3 is a logical diagram of a system for monitoring haul truck positioning, in accordance with at least one example of the present disclosure.

FIG. 3 is a logical diagram of a system 300 for monitoring haul truck positioning, in accordance with at least one example of the present disclosure. The system 300 of FIG. 3 can be used to monitor positions of haul trucks with respect to a paver, a job site, each other, and a plant to determine an optimum grouping of the haul trucks with respect to the jobsite, the paver, the plant, and each other. Any of the previously (or later) discussed systems can be modified to include such a system.

The system 300 can include a plant 302, a plant boundary 304, a paver 306, a jobsite boundary 308, a haul truck 310, and a central computing system 312. Also shown in FIG. 3 are lines interconnecting the components of system 300 where the lines represent communication lines between the components.

The plant 302 can include a locating device configured to transmit a signal indicative of the location of the plant. Because paving material plants are often immobile, a location of the plant 302 may be known. Similarly, the plant boundary 304 can also be known. Alternatively or additionally, the plant boundary 304 can be determined based on a signal received from a locating device of the plant 302. For example, a radius (for example one kilometer) can be applied to the location of the plant 302 to create the plant boundary 304. In some plants, tickets produced by the plant 302 (such as through computers and software located at the plant 302) can be generated when an activity regarding a truck occurs. The ticket can be transmitted to the central computing system 312 to indicate an event, such as a fill of the haul truck 310.

As discussed above with respect to FIG. 2, a paver can include a locating device, where such a locating device can be configured to communicate with the central computing system 312. The central computing system 312 can be a machine (e.g., a computer system) including a hardware processor (e.g., a microprocessor, a controller, a digital signal processor (DSP), an application specific integrated circuit (ASIC), a field-programmable gate array (FPGA), or equivalent discrete or integrated logic circuitry), a volatile and/or non-volatile memory, a display unit, and an alphanumeric input device. The central computing system 312 can include"machine readable medium", which can include any medium that is capable of storing, encoding, or carrying instructions for execution by the central computing system 312 and that cause the central computing system 312 to perform any one or more of the techniques of the present disclosure, or that is capable of storing, encoding or carrying data structures used by or associated with such instructions.

As discussed above, with respect to FIG. 2, the paver 306 can include a locating device. The locating device of the paver 306 can be in communication with the central computing system 312 to provide a signal indicative of a location of the paver 306. The jobsite 308 can be a radius or area around the paver 306 and/or around the surface being created or repaired. The jobsite 308 boundary can be derived from a signal produced by a jobsite location device (such as the paver locating device 224). In some examples, a boundary or geofence of the jobsite 308 can be determined by the central computing system 312 based on a signal from the paver 306 where the central computing system 312 adds, for example, a one-kilometer radius around the paver 306. In some examples, the central computing system 312 can establish a fixed boundary or geofence with respect to a map or coordinate system based on a predetermined location of the jobsite 308.

The haul truck 310 can also include a locating device as discussed above with respect to FIG. 2, where the locating device can produce a signal indicative of a location of the haul truck 310. Operations of the example of FIG. 3 is discussed below with respect to the method of FIG. 4.

Figure 4:
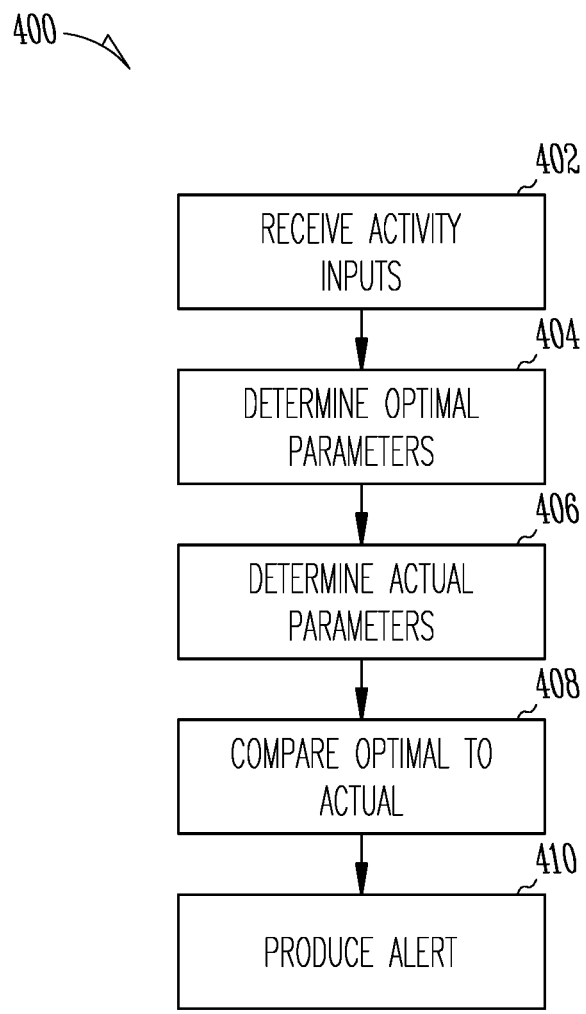
FIG. 4 is a flow chart illustrating a method of operating a system for monitoring haul truck positioning, in accordance with at least one example of the present disclosure.

FIG. 4 is a flowchart illustrating a method 400 of monitoring haul truck positioning, in accordance with at least one example of the present disclosure.

The steps or operations of the method 400 of FIG. 4 are illustrated in a particular order for convenience and clarity. Many of the discussed operations can be performed in a different sequence or in parallel, and some operations may be excluded, without materially impacting other operations. The method of FIG. 4, as discussed, includes operations that may be performed by multiple different actors, devices, and/or systems. It is understood that subsets of the operations discussed in the method of FIG. 4 that are attributable to a single actor, device, or system could be considered a separate standalone process or method.

The method 400 can begin at step 402, where activity inputs can be received. For example, inputs can be received by the central computing system 312 from the plant 302, a locating device of the plant to indicate the plant boundary 304, a locating device of the paver 306, a locating device of the jobsite 308, and a locating device of the haul truck 310.

At step 404, the central computing system can use one or more inputs to determine an optimal or ideal set of parameters for a hauling and paving system. For example, the central computing system 312 can use one or more of these inputs to determine an ideal set of parameters for the system 300. For example, the central computing system 312 can determine an ideal number of haul trucks, an ideal frequency and period for dumping of the haul trucks into the paver, and an ideal spacing of the haul trucks with respect to each other and to the plant and the paver.

At step 406, the central computing system can determine actual parameters of the system. For example, the central computing system 312 can use inputs from the plant 302, the locating device of the paver 306, the locating device of the jobsite 308, and the locating device of the haul truck 310 to determine the location of the haul truck 310, the activities of the haul truck 310, and the duration of each activity of the haul truck 310. In some examples, the actual parameters can be determined and stored prior to determining optimal parameters at step 404.

At step 408, the actual parameters can be compared to optimal parameters. For example, the central computing system 312 can compare the ideal parameters to the actual parameters. Then, at step 410 the central computing system (such as the central computing system 312) can produce an alarm or an alert when one or more of the actual parameters is outside a range of the ideal parameters. For example, the central computing system 312 can produce an alert when the haul truck 310 is not at an ideal location at any given time. For example, if no haul truck is at the paver 306, an alert can be produced. Or, if all the haul trucks have departed the plant 302 but have not yet arrived at the jobsite 308, an alert can be produced. The alarms or alerts can be used by equipment operators, plant operators, truck drivers, coordinators, and other personnel to adjust the flow of haul trucks (and/or operation of the paver) and can be used to adjust the flow of haul trucks in the future.

In another example, a paver location signal indicative of a location of a paver can be received from a paver; and, a first haul truck location signal indicative of a location of a first haul truck from a first haul truck locating device can be received. A plant status signal indicative of a load event of the haul truck can be received from a plant. A central computer can be used to establish a desired location range of the first haul truck based on the paver location signal, the plant status signal, and the first haul truck location signal. The central computer can produce an alert when the location of the haul truck is outside the desired location range.

Figure 5:
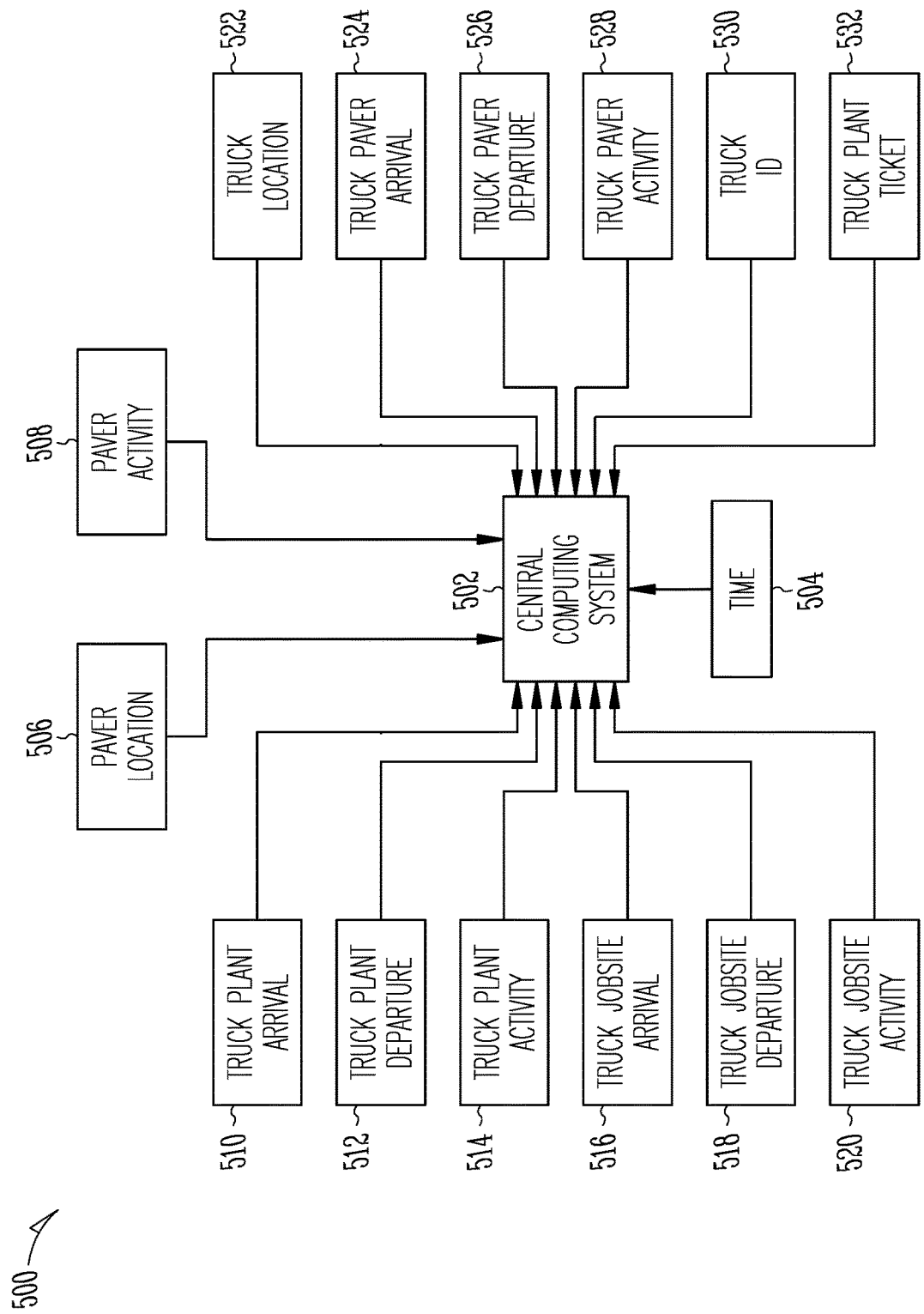
FIG. 5 is a logical diagram of a system for monitoring haul truck positioning, in accordance with at least one example of the present disclosure.

FIG. 5 is a logical diagram of a system 500 for monitoring haul truck positioning, in accordance with at least one example of the present disclosure. The system 500 can include a central computing system 502, which can be a computing system similar to those described above with respect to FIGS. 3 and 4.

Also shown in FIG. 5 are several inputs that can be received by the central computing system 502. In some examples, the central computing system 502 can receive the inputs from sensors or transceivers and in other examples, the central computing system 502 can receive direct input from a user through a user interface. In further examples, the central computing system 502 can use data and/or inputs to produce some of the items shown as inputs of system 500, as discussed in further detail below.

A time 504 can be received and/or produced by the central computing system 502 and can be combined with one or more inputs to make determinations based on the inputs. A paver location 506 can be produced by a paver or paver locating device and can be received at the central computing system 502 through a paver location signal or a signal indicative of a location of the paver. For example, the locating device 218 can produce a signal indicative of a location of the paver 204. Further, information received from the paver and/or the paver locating device can indicate an activity 508 of the paver. The paver activity 508 can be a paving operation such as actively paving, or can be another operation or condition, such as an indicator that a hopper of the paver is empty.

A signal indicative of a truck plant arrival 510 or a truck plant departure 512 can be received by the central computing system 502. Such a signal can be produced by a locating device of a haul truck, for example. Alternatively, the inputs for truck plant arrival 510 and truck plant departure 512 can be determined by comparing other inputs such as a location of a haul truck (haul truck location 522) and a location of the plant. The location of the plant can be provided by a locating device of the plant or can be input into the central computing system 502 by a user.

A truck plant activity 514 can be an input received by the central computing system 502 based on a signal received from a plant. For example, plants can produce a ticket 532 based on loading and unloading of haul trucks and the ticket information or tickets can be transmitted to the central computing system 502 from the plant or plant management system.

A signal indicative of a truck jobsite arrival 516 or a truck jobsite departure 518 can be received by the central computing system 502. Such a signal can be produced by a locating device of the jobsite, for example. Alternatively, the inputs for truck jobsite arrival 516 and truck jobsite departure 518 can be determined by comparing other inputs such as a location of the haul truck (haul truck location 522) and a location of the jobsite (such as the jobsite 308).

A truck jobsite activity 520 can be an input received by the central computing system 502 based on a signal received from a jobsite. For example, when a haul truck receives a load of material to be dumped at a location (such as the plant) the jobsite or a user can transmit to the central computing system 502, that such an activity has occurred.

A truck location 522 can be provided through a signal from a haul truck locating device where the signal is indicative of a location of the truck. The truck location 522 together with the paver location 506 can be used to determine a truck paver arrival 524 where the haul truck arrives at the paver. The truck location 522 together with the paver location 506 can also be used to determine a truck paver departure 526 where the haul truck departs from the paver. Further, the truck location 522 and the paver location 506 can be used to determine a truck paver activity 528, where the time 504 can be used together with the truck location 522 and the paver location 506 to ascertain when the truck paver activity 528 (such as a dump or a dump completion) begins and ends.

Also, a truck ID 532 can be delivered to the central computing system 502, which can include an identity of a haul truck. The truck ID 530 can be transmitted through an individual signal, from the truck plant ticket 532, from the signal including the truck location 522, or from another source.

All of the inputs (504-532) of the system 500 of FIG. 5 can be delivered to the central computing system 502 for comparison and analysis. In some examples, the central computing system 502 can produce a series of additional outputs or parameters that can be used to group haul trucks, as discussed further in FIG. 6 below.

Figure 6:
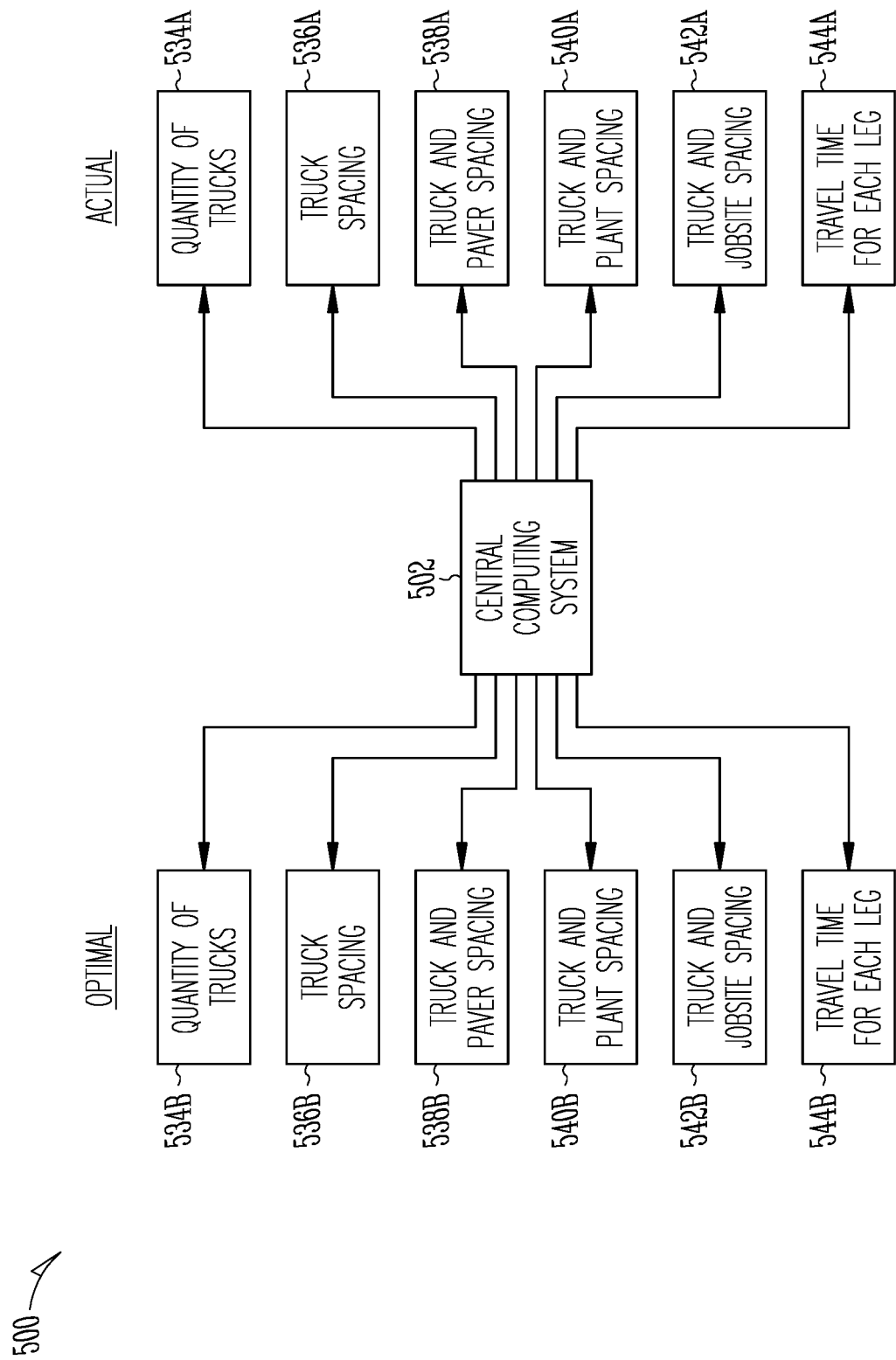
FIG. 6 is a logical diagram of a system for monitoring haul truck positioning, in accordance with at least one example of the present disclosure.

FIG. 6 is a logical diagram of a system 500 for monitoring haul truck positioning, in accordance with at least one example of the present disclosure. The system 500 can be the same as the system 500 of FIG. 5; however, FIG. 6 shows outputs or parameters that can be produced by the central computing system 502.

Using the inputs described in FIG. 5, the central computing system can produce multiple sets of outputs. The central computing system 502 can produce an optimal set of parameters, which can include a quantity of trucks 534B, truck spacing 536B, truck and paver spacing 538B, truck and plant spacing 540B, truck and jobsite spacing 542B, and travel time for each leg 544B.

The optimal quantity of trucks 534B and the truck spacing 536B can be determined based on required travel time between the plant and the jobsite, which can be determined based on one or more of the truck location 522, the paver location 506, and other inputs of FIGS. 3-5 such as truck plant arrival 502 and truck plant departure 512.

Similarly, the truck and paver spacing 538B or an optimal distance or time between the paver and a nearest haul truck can be determined based on characteristics of the operation of the paver. In some examples, a frequency that a paver is loaded, which can be determined using time 504 and truck paver activities 528, can be used to determine how frequently a haul truck should arrive to the jobsite to unload paving material to the paver. Optimal spacing of haul trucks with respect to the paver can help avoid haul trucks from waiting at the jobsite or paver to unload, which can cause material to expire. Optimal spacing of haul trucks with respect to the paver can also help prevent a paver from sitting without paving material, which can help avoid road imperfections and can help improve paving time efficiency.

The truck and jobsite spacing 542B can be calculated similarly by using one or more of the truck location 522, a jobsite location, the truck jobsite arrival 516, the truck jobsite departure 518, the truck jobsite activity 520, or other inputs discussed in FIGS. 3-5. Also, the truck and plant spacing 540B can be determined using one or more of the truck location 522, the plant location, the truck plant arrival 510, the truck plant departure 512, the truck plant activity 514, the plant ticket 532, and other inputs discussed in FIGS. 3-5.

The travel time for each leg 544B can be determined using one or more of map data (including routes), the truck location 522, the plant location, the jobsite location, time 504, the paver location 506, and other inputs discussed in FIGS. 3-5.

Generally, the optimal parameters 534B-544B can be determined based on an arrangement of haul trucks that allows the paver to continue paving without stopping while avoiding wasting paving material through expiration. Once the optimal parameters 534B-544B have been determined, the actual parameters 534A-544A can be determined.

The quantity of trucks 534A can be determined based on one or more of the truck ID 530 of each truck, the truck plant ticket 532, and the truck location 522 (by noting individual signals). The truck spacing 536A can be determined based on the truck location 522 of each truck. The truck and paver spacing 538A can be determined based on the truck location 522 of each truck and the paver location 506. The truck and plant spacing 540A can be determined based on the location 522 of each truck and the location of the plant. The truck and jobsite spacing 542A can be determined based on the truck location 522 of each truck and the location of the jobsite. The travel time for each leg 544A can be determined for each leg using one or more of the inputs discussed above with respect to the actual parameters.

Once the optimal parameters 534B-544B and the actual parameters 534A-544A are determined, the optimal parameters 534B-544B and the actual parameters 534A-544A can be compared to determine whether the actual parameters 534A-544A are within an acceptable range of the optimal parameters 534B-544B. When the actual parameters 534A-544A are out of a preset or desired range of the optimal parameters 534B-544B, the central control system 502 can produce an alarm or an alert to indicate that an undesired result (e.g., expired paving material or inactive paver) can occur. The information provided by the alert can be used by other programs, users, drivers, supervisors, and/or operators to adjust conditions to help avoid the undesired result. In some examples, the alert can be recorded.

Operation of the system described with respect to FIGS. 5 and 6 is further discussed below in FIG. 7.

Figure 7:
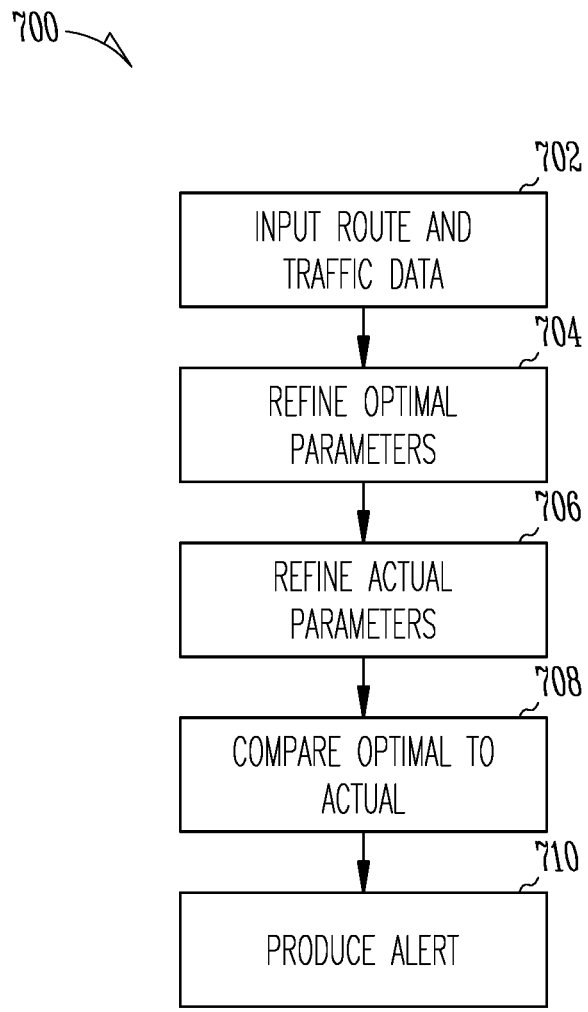
FIG. 7 is a flow chart illustrating a method of operating a system for monitoring haul truck positioning, in accordance with at least one example of the present disclosure.

FIG. 7 is a flow chart illustrating a method 700 of operating a system for monitoring haul truck positioning, in accordance with at least one example of the present disclosure.

FIG. 7 can begin at step 702 where route and traffic data, such as maps, routes, or the like (which can be supplied by one or more map programs and/or services) can be input into the central computer system, such as the central computer system 502. The central computer system 502 can use such data to refine optimal parameters at step 704. For example, such data can be used to refine the optimal parameters 534B-544B.

Then, the actual parameters can be refined at step 706. For example, the map and route data can be used to refine the actual parameters 534A-544A. The refined optimal and actual parameters can then be compared at step 708 to determine if any of the refined actual parameters are outside a desired range of the optimal parameters. When any of the refined actual parameters are determined to be outside the desired range of the optimal parameters, and an alert can be produced at step 710.

Figure 8:
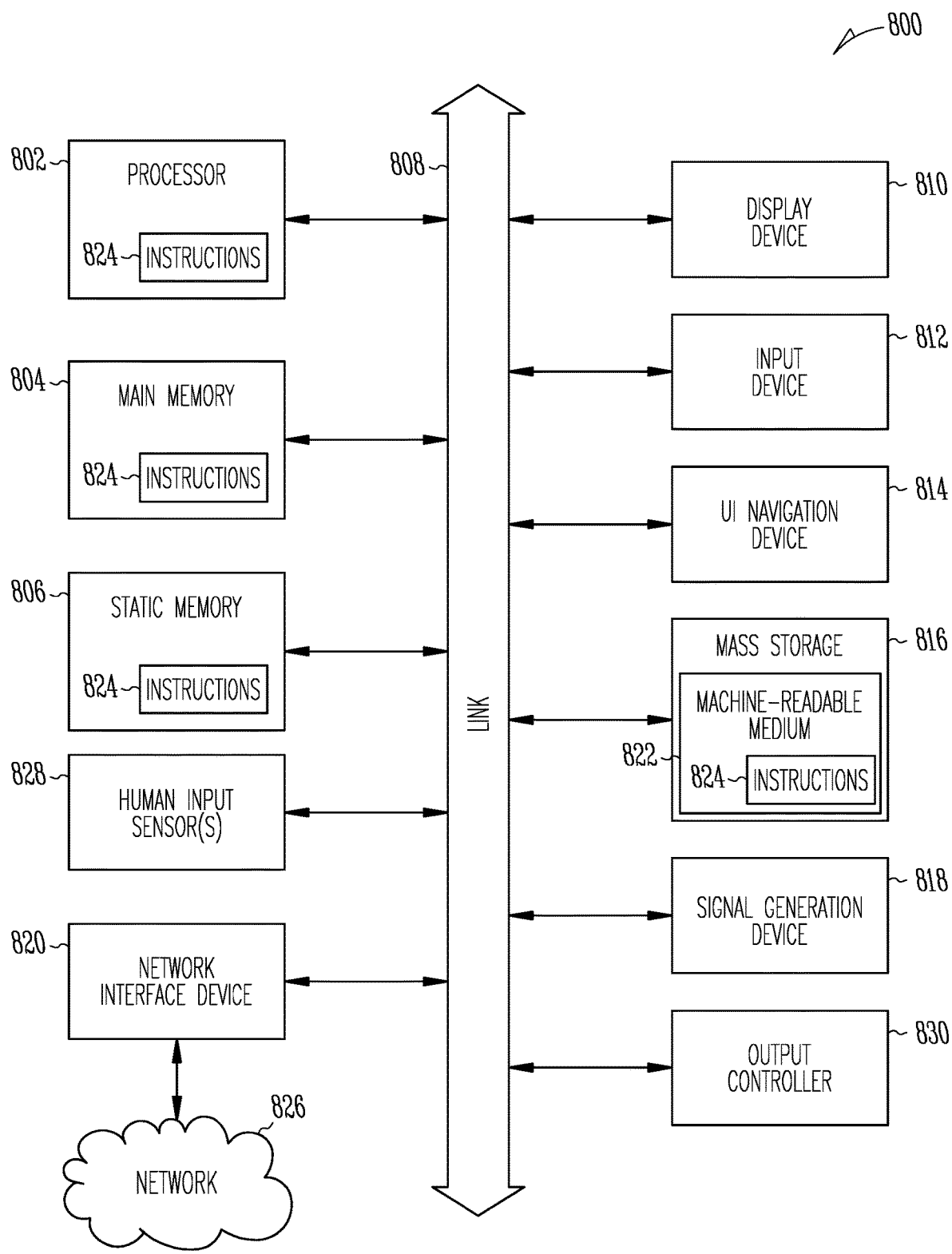
FIG. 8 is a block diagram illustrating an architecture for an example computing system used, according to at least one example of the present disclosure.

FIG. 8 is a block diagram illustrating an example computer system (machine) upon which any one or more of the previous techniques may be performed or facilitated by. The computer system 800 specifically may be used in connection with facilitating the operations of the central computing system 312, the central computing system 502, or any other computing platform described or referred to herein. For example, the computer system 800 can be connected to (or part of) the central computing system 502 for receipt of and processing of signals to generate and analyze inputs and to create outputs, as well as to compare and analyze inputs and outputs (such as those of FIGS. 5 and 6) discussed herein.

In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a smartphone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 800 includes a processor 802 (e.g., a microprocessor, a controller, a digital signal processor (DSP), an application specific integrated circuit (ASIC), a field-programmable gate array (FPGA), or equivalent discrete or integrated logic circuitry), a main memory 804 and a static memory 806, which communicate with each other via a link 808 (e.g., an interlink, bus, etc.). The computer system 800 may further include a video display unit 810, an alphanumeric input device 812 (e.g., a keyboard), and a user interface (UI) navigation device 814 (e.g., a mouse). In an example, the video display unit 810, input device 812 and UI navigation device 814 can be integrated into a single device, such as a touch screen display. The computer system 800 may additionally include a storage device 816 (e.g., magnetic hard discs, optical discs, floppy discs, flash memories, or forms of electrically programmable memories (EPROM) or electrically erasable and programmable (EEPROM) memories), a signal generation device 818 (e.g., a speaker), and a network interface device 820 which may operably communicate with a communications network 826 using wired or wireless communications hardware. The computer system 800 may further include one or more human input sensors 828 configured to obtain input (including non-contact human input) in accordance with input recognition and detection techniques. The human input sensors 828 may include a camera, microphone, barcode reader, RFID reader, near field communications reader, or other sensor producing data for purposes of input. The computer system 800 may further include an output controller 830, such as a serial (e.g., universal serial bus (USB), parallel, or other wired or wireless (e.g., infrared (IR)) connection to communicate or control one or more peripheral devices (e.g., a printer, card reader, etc.).

The storage device 816 may include a machine-readable medium 822 on which is stored one or more sets of data structures or instructions 824 (e.g., software) embodying or utilized by any one or more of the methodologies or functions described herein. The instructions 824 may also reside, completely or at least partially, within the main memory 804, static memory 806, and/or within a cache of the processor 802 during execution thereof by the computer system 800, with the main memory 804, static memory 806, and local memory of the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium (e.g., a non-transitory medium) that is capable of storing, encoding or carrying instructions for execution by the computer system 800 and that cause the computer system 800 to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., frame relay, internet protocol (IP), transmission control protocol (TCP), user datagram protocol (UDP), hypertext transfer protocol (HTTP)). Examples of communication networks include a local area network (LAN), wide area network (WAN), the Internet, mobile telephone networks. Plain Old Telephone (POTS) networks, and wireless data networks (e.g., Wi-Fi, 3G, and 4G LTE/LTE-A or 5G networks). The term "transmission medium" shall be taken to include any intangible medium that is capable of storing, encoding, or carrying instructions for execution by the computing system 800, and includes digital or analog communications signals or other intangible medium to facilitate communication of such software.

As an additional example, computing embodiments described herein may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

INDUSTRIAL APPLICABILITY

The disclosed systems may be applicable to paving operations including monitoring haul trucks traveling between a paver, jobsite, and plant where the haul trucks deliver paving materials to the paver to be used by the paver to create a finished road way or surface. The disclosed systems and methods may help to reduce waste of paving materials and increase paving efficiency, helping to reduce cost.

In some examples, a central computing system can be used to receive location signals from one or more haul trucks, a jobsite, and a paver so that an optimum grouping or flow can be determined and so that an alert can be produced when any of the haul trucks is outside of the optimum grouping or optimum location at any given time. Further, information from an asphalt plant, such as ticket information, can be used to determine when a haul truck unloads or loads. Such information can be further used by the central computing system to determine an optimal haul truck grouping and flow arrangement and whether each haul truck is at a position or location compliant with an optimal haul truck grouping.

What is claimed is:

1. A system for monitoring haul truck positioning, the system comprising:
a paver locating device couplable to a paver and configured to produce a paver location signal indicative of a location of the paver;
a haul truck locating device securable to a haul truck, the haul truck locating device configured to produce a haul truck location signal; and
a central computer configured to:
determine a location of the haul truck based on the haul truck location signal;
determine a jobsite boundary of a paving jobsite based on the paver location signal or a predetermined location of the jobsite;
define a desired location range of the haul truck based on the paver location signal, the jobsite boundary, and the haul truck location signal; and
produce an alert when the location of the haul truck is outside the desired location range.

2. The system of claim 1, wherein the predetermined location used to determine the jobsite boundary is a selected area of a map.

3. The system of claim 2, wherein the central computer is further configured to determine the desired location range of the haul truck based on the paver location signal, a jobsite geofence signal, and the haul truck location signal.

4. The system of claim 3, further comprising:
a second locating device securable to a second haul truck, the second locating device configured to produce a second haul truck location signal indicative of a second location of the second haul truck.

5. The system of claim 4, wherein the central computer is further configured to receive the second haul truck location signal and is configured to determine the desired location range of the haul truck based on the second haul truck location signal, the paver location signal, the jobsite geofence signal, and the haul truck location signal.

6. The system of claim 1, wherein the central computer is further configured to receive a plant status signal indicative of a loading activity of the haul truck from a plant and is configured to determine the desired location range of the haul truck based on the plant status signal, the paver location signal, the jobsite geofence signal, and the haul truck location signal.

7. The system of claim 1, further comprising:
a second locating device securable to a second haul truck, the second locating device configured to produce a second haul truck location signal based on a second location of the second haul truck;
wherein the central computer is further configured to receive a plant status indicative of a loading activity of the haul truck signal from a plant; and
wherein the central computer is further configured to determine the desired location range of the haul truck based on the plant status signal, the second haul truck location signal; the paver location signal, the jobsite boundary, and the haul truck location signal.

8. The system of claim 1, wherein the central computer is further configured to compare the haul truck location to the jobsite boundary to determine a haul truck jobsite arrival and a haul truck jobsite departure.

9. The system of claim 1, wherein the central computer is further configured to compare the haul truck location to the paver location to determine a haul truck paver arrival and a haul truck paver departure.

10. The system of claim 1, wherein the central computer is further configured to compare the haul truck location to the paver location to determine a haul truck dump activity.

11. The system of claim 1, further comprising:
a second locating device securable to a second haul truck, the second locating device configured to produce a second haul truck location signal based on a second location of the second haul truck;
wherein the central computer is further configured to receive the second haul truck location signal and is configured to determine the desired location range of the haul truck and a desired location range of the second haul truck based on the second haul truck location signal, the paver location signal, the jobsite boundary, and the haul truck location signal.

12. A method of establishing a desired flow of haul trucks with respect to a jobsite, the method comprising:
receiving, from a paver locating device, a paver location signal indicative of a location of a paver;
receiving, from a first haul truck locating device, a first haul truck location signal indicative of a location of the first haul truck;
establishing a jobsite geofence indicative of a boundary of the jobsite;
establishing, by a central computer, a desired location range of the first haul truck based on the paver location signal, the jobsite geofence signal, a paving activity of the paver, and the first haul truck location signal; and
producing an alert when the location of the first haul truck is outside the desired location range.

13. The method of claim 12, further comprising:
receiving, from a plant, a plant status signal indicative of a load event of the haul truck from the plant.

14. The method of claim 12, wherein the plant status signal includes ticket information about the first haul truck.

15. The method of claim 12, wherein establishing, by the central computer, the desired location range of the first haul truck is based on the plant status signal.

16. A method of establishing a desired flow of haul trucks with respect to a jobsite, the method comprising:
receiving, from a paver locating device, a paver location signal indicative of a location of a paver;
receiving, from a first haul truck locating device, a first haul truck location signal indicative of a location of a first haul truck;
receiving, from a second haul truck locating device, a second haul truck location signal indicative of a location of a second haul truck;
establishing, by a central computer, a desired location range of the first haul truck based on the paver location signal, the first haul truck location signal, and the second haul truck location signal; and
producing an alert when the location of the first haul truck is outside the desired location range.

17. The method of claim 16, further comprising:
establishing, by a central computer, a desired location range of the second haul truck based on the paver location signal, the first haul truck location signal, and the second haul truck location signal; and
producing an alert when the location of the second haul truck is outside the desired location range.

18. The method of claim 17, further comprising:
establishing, by a central computer, a desired quantity of haul trucks based on the paver location signal, the first haul truck location signal, and the second haul truck location signal.

19. The method of claim 18, further comprising:
establishing an actual quantity of haul trucks based on a plurality of haul truck locations signals including first haul truck location signal and the second haul truck location signal; and
producing an alert when the actual quantity of haul trucks is greater than the desired quantity of haul trucks.

20. The method of claim 16, further comprising:
receiving, from a plant, a plant status signal indicative of a load event of the haul truck
establishing, by a central computer, a desired location range of the first haul truck based on the paver location signal, the first haul truck location signal, and the second haul truck location signal; and
producing an alert when the location of the haul truck is outside the desired location range.

* * * * *